Patented Mar. 11, 1941

2,234,568

UNITED STATES PATENT OFFICE 2,234,568

PRODUCTION OF HYDROCARBONS

Eduard Linckh, Ludwigshafen - on - the - Rhine, Germany, assignor, by mesne assignments, to William E. Currie, New York, N. Y.

No Drawing. Application January 18, 1937, Serial No. 121,238. In Germany January 21, 1936

5 Claims. (Cl. 260—449)

This invention relates to the production of hydrocarbons from carbon monoxide and hydrogen.

In my copending application Ser. No. 72,672 I have described a process for the preparation of, in particular, more than one carbon-atom-containing gaseous, liquid and solid hydrocarbons and, if desired, their derivatives containing oxygen, from carbon monoxide and hydrogen, in which parts of the apparatus consisting of metal, in particular of iron, and etched on one surface are used as catalysts. These etched surfaces of the apparatus parts are swept by the reaction gases while the other side of these apparatus parts is swept by a gaseous or liquid heating or cooling agent for the purpose of supplying or withdrawing the heat of reaction. In this manner especially good yields may be obtained with large conversions without a further addition of catalyst to the reaction chamber being necessary.

The said catalysts consisting of etched surfaces suffer, however, after a certain time of operation some diminution in their activity, in the same way as many other catalysts. This renders an interruption of the conversion necessary and a reactivation of the catalyst.

I have now found that the catalysts consisting of etched apparatus parts can be very readily activated again after diminution of their activity by decomposing on them small amounts of volatile metal compounds which are capable of decomposing at elevated temperatures, in particular at temperatures up to 500° C., if desired in a reducing atmosphere, with the formation of metals. For this purpose the carbonyls of iron, nickel, cobalt and molybdenum have proved especially advantageous, of which iron carbonyl is the most suitable. The decomposition of the volatile metal compounds may be effected for example by vaporizing a small amount of the compound in the reaction gas and decomposing the same during the conversion of the reaction gas at the usual reaction temperature. The volatile metal compounds, in particular the carbonyls, may naturally also be vaporized as such in an atmosphere of inert or reducing gas, in particular of hydrogen, and decomposed at a suitable temperature. It has been found to be especially advantageous to add very small amounts of the said volatile metal compounds continuously to the reaction gas whereby the catalyst consisting of etched surfaces is continuously regenerated. In this case it has been found to be preferable to add from about 0.01 to 10 cubic centimeters of volatile metal compound, in particular iron carbonyl, per day per liter of reaction space. The amount of metal compound to be added depends to a great extent on the reaction temperature because most volatile metal compounds, as for example iron carbonyl, leave the reaction chamber partially undecomposed. When the volatile metal compound is added not continuously but at intervals, as for example after some hours or days, amounts of from 0.1 to 1 cubic centimeter per liter of reaction space may, for example, be employed. The vaporization of the volatile metal compounds may be effected merely by leading the gas current over the metal compound for example at from about 0° to 20° C. or, naturally, it may be heated to higher temperatures when necessary. The metal compound may be vaporized as such or a solution of the compound in a solvent, as for example in alcohols, hydrocarbons, organic acids or esters, may be used for vaporization.

It has been found that the process according to this invention is not restricted to the use of etched apparatus parts. Good results are also obtained in other cases when the reaction chamber is empty, i. e. when it is not filled with solid catalytic bodies, for example with chips, pieces and the like, in particular when working with unetched apparatus parts, by adding the said volatile metal compounds, in particular carbonyls, and especially iron carbonyl, in small amounts either continuously or at intervals during the conversion of the carbon monoxide or at a temporary interruption of the operation. For example tubes may be used which have been cleaned and on the surface of which the carbonyl is then decomposed. These tubes may consist of any material, as for example, iron, copper, aluminum or also ceramic materials, such as glass, porcelain or quartz materials or they may be coated with such materials as are for example enameled metals.

The yields of hydrocarbons and their derivatives containing oxygen (such as methanol or other alcohols, aldehydes, ketones or carboxylic acids) are, indeed, not as high when using non-etched apparatus parts for the conversion as those obtained with etched apparatus parts but the metals formed by the decomposition of the volatile metal compounds and deposited on the surfaces of the apparatus parts obviously exert a catalytic action on the conversion in the case of unetched apparatus parts, the said action leading to a good yield of the desired products.

It is advantageous to carry out the process at increased pressures, especially at pressures of more than 20 atmospheres. The temperatures to be used are those usual for the conversion, namely between 150° and 500°, advantageously between 250° and 400° C. The concentrations of hydrogen and carbon monoxide in the initial gas are also as usual, namely between 10 and 0.3 parts and preferably between 2 and 0.5 parts of hydrogen for each part of carbon monoxide.

The following example will further illustrate the nature of this invention but the invention is not restricted to this example.

*Example*

Within an autoclave of 1.7 liters capacity there is arranged a spiral 6 meters long of 40 windings of iron pipe having an internal diameter of 5 millimeters and an external diameter of 8 millimeters. Superheated steam at a temperature of about 330° C. is led through the interior of the iron pipe. The iron pipe has been pretreated by etching the outside with a solution of 200 grams of magnesium nitrate, 50 grams of potassium nitrate and 5 grams of uranyl nitrate in 100 cubic centimeters of water and 1000 cubic centimeters of glacial acetic acid (the tube being suspended in the solution for 24 hours) and then dried.

Hydrogen is led through the autoclave at 400° C. under a pressure of 100 atmospheres for 10 hours. Then, at 100 atmospheres pressure and at temperatures between 330° and 400° C., a mixture of 40 per cent of carbon monoxide and 60 per cent of hydrogen is led through for 8 weeks in such an amount that 1 cubic meter of final gas is obtained per hour. The daily yield is from about 1.6 to 2.4 kilograms of hydrocarbons, alcohols, esters, acids and the like having more than 2 carbon atoms. In the last 7 days the yield rapidly decreases almost to nil. By one addition of 25 cubic centimeters of iron carbonyl in a small autoclave arranged before the reaction autoclave and through which the reaction gas flows, the yield can again be increased to 1.8 kilograms of hydrocarbons and their oxygen derivatives per day for a period of 14 days while maintaining otherwise identical conditions. After a further vaporization of 70 cubic centimeters of iron carbonyl within a period of 6 days, the daily yield remains at the same value; thereupon about every 8 to 14 days 10 cubic centimeters of iron carbonyl are vaporized in order to maintain the same yield. By vaporizing 100 cubic centimeters of a solution of 50 cubic centimeters of iron carbonyl in 1000 cubic centimeters of the oil obtained by the reaction, the yield may be increased to from 2.3 to 2.7 kilograms of hydrocarbons containing more than one carbon atom per day. Up to that time the repeatedly regenerated catalyst has been continuously in operation for 140 days. A deposit of carbon in the autoclave which may occur about every 8 weeks may be readily removed by scraping without the catalyst tube being rendered useless. The temperature in the chamber fluctuates between 338° and 354° C. and the pressure between 100 and 120 atmospheres. In addition to the hydrocarbons, an about equal amount of an aqueous product is obtained which contains from about 5 to 20 per cent by volume of alcohols.

The products referred to as hydrocarbons contain from 1 to 3 per cent of oxygen (combined in the form of alcohols, acids, esters and the like).

What I claim is:

1. A process for the production of hydrocarbons by the catalytic reaction of carbon monoxide with hydrogen, which comprises passing a suitable mixture of such substances through a reaction chamber heated to reacting temperature, which chamber is substantially free from solid catalytic bodies not forming a part of the walls thereof, into which chamber amounts of from 0.1 to 1 cubic centimeters per liter of reaction space of a volatile metal carbonyl which will decompose at the reaction temperature are introduced at intervals, when necessary as indicated by a drop in the normal output of hydrocarbons.

2. The process according to claim 1 in which the metal carbonyl is selected from the group consisting of carbonyls of iron, nickel, cobalt and molybdenum.

3. The process according to claim 1 in which the reaction space is confined by surfaces of which part at least is comprised of an etched metal.

4. The process according to claim 1 in which the reaction space is confined by surfaces of which part at least is comprised of an etched iron.

5. The process according to claim 1 in which the metal carbonyl is diluted by a solvent.

EDUARD LINCKH.